United States Patent [19]

Mawatari et al.

[11] Patent Number: 4,742,115

[45] Date of Patent: May 3, 1988

[54] HEAT RESISTANT, THERMOPLASTIC RESIN COMPOSITION

[75] Inventors: Masaaki Mawatari, Suzuka; Syuji Tsuchikawa; Shinichi Kimura, both of Yokkaichi; Nobuyuki Katsuki, Kuwana; Mitsuo Abe, Yokkaichi, all of Japan

[73] Assignee: Japan Synthetic Rubber Co., Ltd., Tokyo, Japan

[21] Appl. No.: 762,828

[22] Filed: Aug. 6, 1985

Related U.S. Application Data

[63] Continuation-in-part of Ser. No. 623,035, Jun. 21, 1984, abandoned.

[30] Foreign Application Priority Data

| | | |
|---|---|---|
| Jul. 1, 1983 [JP] | Japan | 58-118157 |
| Jul. 1, 1983 [JP] | Japan | 58-118158 |
| Aug. 8, 1984 [JP] | Japan | 59-164909 |

[51] Int. Cl.[4] ............................................. C08L 71/04
[52] U.S. Cl. ..................................... 525/68; 525/242; 525/244; 525/905
[58] Field of Search ................................ 525/68, 905

[56] References Cited

U.S. PATENT DOCUMENTS

| | | | |
|---|---|---|---|
| 2,713,566 | 7/1955 | Reid | 525/234 |
| 2,820,773 | 1/1958 | Childers et al. | 525/316 |
| 4,128,602 | 12/1978 | Katchman et al. | 525/905 |
| 4,405,753 | 9/1983 | Deets et al. | 525/905 |
| 4,415,708 | 11/1983 | Matsumura et al. | |
| 4,563,505 | 1/1986 | Abe et al. | |

*Primary Examiner*—Jacob Ziegler
*Attorney, Agent, or Firm*—Oblon, Fisher, Spivak, McClelland & Maier

[57] ABSTRACT

A heat resistant thermoplastic resin composition comprising (a) 5 to 99% by weight of a poly(phenylene ether), (b) 95 to 1% by weight of a thermoplastic resin which is obtained by polymerizing in the absence of a rubber-like polymer a resin constituent mixture comprising an aromatic alkenyl compound, an alkenyl cyanide compound, and, if necessary, other alkenyl monomers copolymerizable with said monomers, and (c) up to 94% by weight of other styrenic resins, said thermoplastic resin (b) comprising (A) 1–50% by weight of a polymer having an alkenyl cyanide compound content of 1% by weight or more but less than 10% by weight, (B) 1–70% by weight of a polymer having an alkenyl cyanide compound content of 10% by weight or more but less than 20% by weight, (C) 5–90% by weight of a polymer having an alkenyl cyanide compound content of 20% by weight or more but less than 40% by weight, and (D) up to 70% by weight of a polymer having an alkenyl cyanide compound content of 40% by weight or more, and having a total alkenyl cyanide compound content of 10 to 40% by weight and an intrinsic viscosity of preferably 0.1–1.5 dl/g as measured in methyl ethyl ketone at 30° C. The above thermoplastic resin composition is excellent in not only heat resistance but also impact resistance, thermal stability, painting, and surface gloss of molded article.

27 Claims, No Drawings

HEAT RESISTANT, THERMOPLASTIC RESIN COMPOSITION

CROSS-REFERENCE TO RELATED APPLICATION

This application is a continuation-in-part, of application Ser. No. 623,035 filed June 21, 1984, now abandoned.

BACKGROUND OF THE INVENTION

1. Field of the Invention

The present invention relates to a novel resin composition obtained by compounding a thermoplastic resin composition with poly(phenylene ether), which gives molded articles excellent in heat resistance, impact resistance, surface gloss, painting, and thermal stability.

2. Description of the Related Art

Poly(phenylene ether) is widely known as a resin excellent in heat resistance, mechanical and electrical properties. This resin, however, is used seldom alone but mostly in combination with polystyrene or rubber-modified polystyrene for forming a modified resin, because of its low imact resistance, insufficient processability, and unsatisfactory chemical resistance. Since the modified poly(phenylene ether) is excellent in heat resistance, mechanical and electrical properties, and processability, it is widely used in automotive parts, office appliances, electric appliance parts, and the like.

Since the rubber-modified polystyrene is produced generally by the bulk-suspension polymerization of the monomeric styrene containing a rubber-like polymer dissolved therein, it is necessary to limit the concentration of the polymer to a certain range which is favorable for the phase transition in view of the solution viscosity. Accordingly, the amount of the rubber-like polymer is preferably about 10% by weight or less based on the weight of the rubber-modified polystyrene. A composition comprising the rubber-modified polystyrene of such a recipe and the poly(phenylene ether) does not exhibit a sufficient impact resistance and, as a consequence, the molded article tends to break at the corner or thin wall portion at the time of being released from the mold. A rubber-like elastomer is, therefore, incorporated in the composition to improve the imact resistance. Even in this case, the resulting composition is not sufficient in impact strength and, in addition, tends to discolor upon heating, and is inferior in processability.

Furthermore, a composition consisting of a rubber-modified polystyrene and a poly(phenylene ether) gives a molded product which has disadvantages that surface gloss is inferior, such phenomena as cracking, crazing, absorption (the coating surface is unevenly colored) and the like tend to be caused at the surface when the molded article is coated, and painting is inferior.

The styrene-acrylonitrile copolymer and the rubber-like polymer-styrene-acrylonitrile copolymer (ABS resin) are widely used as resins excellent in painting, solvent resistance, impact resistance, and processability. However, these resins generally contain 20 to 30% by weight of acrylonitrile and, as a consequence, are unsatisfactory in compatibility with poly(phenylene ether); the blend, therefore, gives molded articles generally unsatisfactory in appearance, impact resistance, heat resistance, and painting.

The modified poly(phenylene ether) has high heat resistance and hence is molded at high temperatures. Therefore, the modified polyphenylene ether is required not to cause deterioration of physical properties when molded at high temperatures. However, in fact, the impact resistance thereof is greatly deteriorated when it is molded at high temperatures (hereinafter referred to as thermal stability).

Various means have been proposed to eliminate the above-noted disadvantages of the modified poly(phenylene ether). For instance, Japanese Patent Publication No. 8,139/82 discloses a blend of a methyl methacrylate-modified ABS resin and a poly(phenylene ether). Such a blend, however, is poor in thermal stability and is commercially unfavorable owing to an increase in cost resulting from the high cost of methyl methacrylate. Japanese Patent Publication No. 40,046/73 discloses a heat resistant resin blend obtained by blending a styrene-acrylonitrile copolymer having an acrylonitrile content smaller than that of a generally available copolymer and a poly(phenylene ether). The resulting resin blend, however, is not sufficiently improved in heat resistance and solvent resistance. The molded articles made from both resin blends described in the above two patent publications are also unsatisfactory in surface gloss and painting.

There is also proposed a composition comprising a poly(phenylene ether) and a styrenic resin having a large alkenyl cyanide compound content which has added thereto a specific amount of a styrenic resin containing a small amount alkenyl cyanide compound. Such a composition, however, is still unsatisfactory in painting and thermal stability.

SUMMARY OF THE INVENTION

The present inventors have made extensive research directed to the discovery of a thermoplastic resin composition excellent in heat resistance, impact resistance, surface gloss, thermal stability and painting. As a result, it has been found unexpectedly that the above improvement can be achieved by blending a poly(phenylene ether) with a specific amount of an aromatic alkenyl compound-alkenyl cyanide compound copolymer obtained by copolymerizing the monomers so that the alkenyl cyanide compound content has a specific composition distribution, a graft-copolymer of an aromatic alkenyl compound and an alkenyl cyanide compound on a rubbery polymer in which the alkenyl cyanide compound in the aromatic alkenyl compound-alkenyl cyanide compound copolymer grafted on the rubbery polymer is in a small amount area, and if necessary, a styrenic resin.

The object of this invention is to provide a novel thermoplastic resin composition excellent in heat resistance, impact resistance, surface gloss, and thermal stability of the molded article, which is produced by blending the specific thermoplastic resin ccmposition and a poly(phenylene ether).

According to this invention, there is provided a thermoplastic resin composition which comprises (a) 5 to 99% by weight of a poly(phenylene ether), (b) 95 to 1% by weight of a thermoplastic resin which is obtained by polymerizing, in the absence of a rubber-like polymer, a resin constituent mixture ccnsisting of an aromatic alkenyl compound, an alkenyl cyanide compound, and, if necessary, other alkenyl monomers copolymerizable with said monomers, and (c) 0 to 94% by weight of other styrenic resins, said thermoplastic resin (b) comprising (A) 1–50% by weight of a polymer having an alkenyl cyanide compound content of 1% by weight or more but less than 10% by weight, (B) 1-70%, preferably 5-70%, by weight of a polymer having an alkenyl cyanide compound content of 10% by weight or more but less than 20% by weight, (C) 5-90%, preferably 10-90%, by weight of a polymer having an alkenyl cyanide compound content of 20% by weight or more but less than 40% by weight, and (D) 0-70% by weight of a polymer having an alkenyl cyanide compound content of 40% by weight or more, and having a total alkenyl cyanide compound content of 10 to 40% by weight and an intrinsic viscosity of preferably 0.1-1.5 dl/g as measured in methyl ethyl ketone at 30° C.

DETAILED DESCRIPTION OF THE INVENTION

The poly(phenylene ether) (a) used in the composition of this invention is a polymer obtained by the oxidative coupling polymerization in the presence of a known catalyst of at least one phenolic compound represented by the formula,

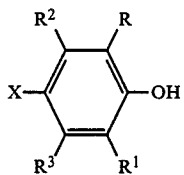

wherein X is hydrogen, chlorine, bromine, or iodine; R is a monovalent substituent selected from hydrocarbon groups, hydrocarbonoxy groups, halohydrocarbon groups having at least 2 carbon atoms between the halogen atom and the phenol nucleus, and halohydrocarbonoxy groups; $R^1$ is the same as R or a halogen atom; each of $R^2$ and $R^3$ is the same as $R^1$ or a hydrogen atom, provided that R, $R^1$, $R^2$, and $R^3$ are free from tertiary carbon atom.

Especially preferred among the above phenolic compounds are those represented by the general formula,

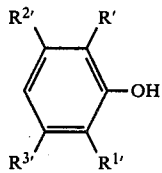

wherein each of R' and $R^{1'}$ is a monovalent substituent selected from hydrocarbon groups having 1 to 8 carbon atoms and each of $R^{2'}$ and $R^{3'}$ is a hydrogen atom or a monovalent substituent selected from hydrocarbon groups having 1 to 8 carbon atoms. The most preferred phenolic compounds include 2,6-dimethylphenol, 2,6-diethylphenol, 2-methyl-6-ethylphenol, 2-methyl-6-allylphenol, 2-methyl-6-phenylphenol, 2,6-diphenylphenol, 2,6-dibutylphenol, 2-methyl-6-propylphenol, 2,3,6-trimethylphenol, 2,3-dimethyl-6-ethylphenol, 2,3,6-triethylphenol, 2,3,6-tripropylphenol, 2,6-dimethyl-3-ethylphenol, 2,6-dimethyl-3-propylphenol and the like. The most preferable examples of the poly(phenylene ether) are poly(phenylene ether) obtained from 2,6-dimethylphenol and poly(phenylene ether) obtained by copolymerizing 2,6-dimethylphenol and 2,3,6-trimethylphenol. In particular, the copolymeric poly(phenylene ether) obtained from 2,3,6-trimethylphenyl and 2,6-dimethylphenol is superior in heat resistance, impact resistance, surface gloss of molded article, processability, and thermal stability.

The intrinsic viscosity [η] of the poly(phenylene ether) for use in this invention as measured in chloroform at 30° C. is not clitical, though it is preferably 0.2 to 1, more preferably 0.3 to 0.7, dl/g. The proportion of poly(phenylene ether) in the thermoplastic resin composition of this invention is 5 to 99%, preferably 10 to 90%, more preferably 10 to 60%, by weight. If the proportion is less than 5% by weight, no outstanding effect on the heat resistance is observed, whereas if it exceeds 99% by weight, no improvement is observable in impact resistance and processability.

The thermoplastic resin (b) used in this invention is explained below. The aromatic alkenyl compounds used in the thermoplastic resin (b) are styrene, α-methylstyrene, methylstyrene, vinylxylene, monochlorostyrene, dichlorostyrene, dibromostyrene, p-tert-butylstyrene, ethylstyrene, and vinylnaphthalene. These compounds are used alone or in admixture of two or more. A preferable aromatic alkenyl compound is styrene. In the case of a mixture, a preferable styrene content is 50% by weight or more.

The alkenyl cyanide compounds used in the thermoplastic resin (b) include acrylonitrile and methacrylonitrile, of which a preferred one is acrylonitrile. In the thermoplastic resin (b) used in this invention, the total average alkenyl cyanide compound content of the thermoplastic resin (b) is 10 to 40%, preferably 15 to 35%, more preferably 15 to 30%, most preferably 20 to 28%, by weight. If the alkenyl cyanide compound content is below 10% by weight, the molded article becomes inferior in surface gloss, painting and impact resistance, whereas if the alkenyl cyanide compound content exceeds 40% by weight, the processability is deteriorated and the molded article becomes inferior in surface gloss, processability, heat resistance and impact resistance.

The thermoplastic resin (b) used in this invention is characterized in that the bound alkenyl cyanide content in each of the copolymers constituting the resin (b) has a composition distribution, and the compositions of polymers different in alkenyl cyanide compound content in the thermoplastic resin (b) are as follows:

(A) The proportion of the polymer having an alkenyl cyanide compound content of 1% by weight or more and less than 10% by weight is 1 to 50%, preferably 5 to 40%, most preferably 5 to 30%, by weight. If said proportion is less than 1% by weight, the molded article is inferior in heat resistance, impact resistance, surface gloss and painting, whereas if the proportion is more than 50% by weight, the molded article is inferior in painting.

(B) The proportion of the polymer having an alkenyl cyanide compound content of 10% by weight or more and less than 20% by weight is 1 to 70%, preferably 5 to 70%, still preferably 5 to 60%, most preferably 7 to 50% by weight. If said proportion is less than 1% by weight, the molded article is inferior in heat resistance, impact resistance, and painting whereas if it exceeds 70% by weight, the painting and the thermal stability are decreased.

(C) The proportion of the polymer having an alkenyl cyanide compound content of 20% by weight or more and less than 40% by weight is 5 to 90%, preferably 10 to 90%, more preferably 10 to 80%, still more preferably 20 to 80%, and most preferably 30 to 80%, by weight. If said proportion is less than 5% by weight, the molded article is inferior in painting, whereas if it exceeds 90% by weight, the heat resistance, impact resistance, surface gloss, painting and thermal stability are inferior.

(D) The proportion of the polymer having an alkenyl cyanide compound content of 40% by weight or more is 0 to 70%, preferably 0 to 20%, most preferably 0%, by weight. If said proportion exceeds 70% by weight, the heat resistance, impact resistance, surface gloss, thermal stability and painting are inferior.

The thermoplastic resin (b) used in this invention has an intrinsic viscosity as measured in toluene at 30° C. of preferably 0.1 to 1.5, more preferably 0.3 to 1.5, most preferably 0.4 to 0.8 dl/g.

The alkenyl monomers copolymerizable with the aromatic alkenyl compounds and alkenyl cyanide compounds used in this invention include alkyl acrylates such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, and benzyl acrylate; alkyl methacrylates such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, and benzyl methacrylate; unsaturated acid anhydrides such as maleic anhydride, itaconic anhydride, and citraconic anhydride; and unsaturated acids such as acrylic acid and methacrylic acid. These compounds are used alone or in admixture of two or more. The copolymerizable alkenyl monomers are added to the resin constituents in an amount of preferably 50% by weight or less, more preferably 30% by weight or less, and particularly preferably 5% by weight or less.

The content of the thermoplastic resin (b) in the poly(phenylene ether) resin composition of this invention is 1 to 95% by weight, preferably 5 to 90% by weight, more preferably 5 to 60% by weight, and particularly preferably 5 to 50% by weight, and most preferably 5 to 30% by weight. If the content is less than 1% by weight, the molded article is inferior in heat resistance, surface gloss, painting and impact resistance, and if it exceeds 95% by weight, the imact resistance and heat resistance are inferior.

The thermoplastic resin (b) used in this invention can be produced by bulk polymerization, solution polymerization, suspension polymerization, bulk-solution polymerization, bulk-suspension polymerization, bulk polymerization-solution polymerization, emulsion polymerization, or emulsion-suspension polymerization.

As mentioned previously, the thermoplastic resin (b) used in this invention contains the polymers (A) to (D) of different alkenyl cyanide compound contents as mentioned above, and the resin (b) can be obtained by the polymerization of the resin constituents while varying the composition of the constituents. Such polymerization is carried out by polymerizing at first a resin constituent mixture with a smaller alkenyl cyanide compound content, then polymerizing a resin constituent mixture with an increased alkenyl cyanide compound content. In this manner, polymerization is repeated while increasing stepwise the alkenyl cyanide compound content in the resin constituent mixture. The object can be achieved by other methods of polymerization such as a method in which the alkenyl cyanide compound content of the resin constituent mixture is continuously increased; a method in which at first a resin constituent mixture higher in alkenyl cyanide compound content is polymerized followed by the polymerization of a resin constituent mixture having a lower alkenyl cyanide compound content, and polymerization is repeated in this manner while decreasing stepwise the alkenyl cyanide compound content of the resin constituent mixture; a method in which the polymerization is continued while decreasing continuously the alkenyl cyanide compound content in the resin constituent mixture; or a method which is a combination of the above methods. The relation between the monomer composition of the resin constituent mixture and the composition of the resulting resin polymer can previously be predicted through the widely known copolymer composition formula (e.g. T. Ohtsu, "Chemistry of Polymer Synthesis (Revised)", pp. 108–109, Kabushiki Kaisha Kagaku Dojin, 1979). Accordingly, the thermoplastic resin (b) used in this invention is obtained easily by suitably controlling the polymerization conditions including the monomer ratio.

The addition of monomers to the polymerization system can be carried out, for example, in one of the following ways:

(a) Addition of the monomer mixture.
(b) Addition of each of the monomers separately without previously mixing the monomers together.
(c) Combination of (a) and (b).
(d) Stepwise addition of the monomers in two or more portions in the procedures (a), (b) and (c).
(e) Continuous addition of the monomers in the procedures (a), (b) and (c).
(f) Combinations of the procedures (a) to (e).

Auxiliary chemicals used in the polymerization of the resin constituent mixture by an emulsion polymerization method include the following: Polymerization initiators, preferably redox-type initiators consisting of a combination of an oxidizing agent and a reducing agent; persulfates such as potassium persulfate and ammonium persulfate; azobisisobutyronitrile; benzoyl peroxide and lauroyl peroxide. Especially preferred are redox-type initiators consisting of an organic hydroperoxide (oxidizing agent), the representatives of which are cumene hydroperoxide, diisopropylbenzene hydroperoxide, and p-menthane hydroperoxide, and a reducing agent, the representatives of which are sugar-containing pyrophosphate recipe, sulfoxylate recipe, and mixed sugar-containing pyrophosphate recipe-sulfoxylate recipe.

Chain transfer agents, preferably mercaptans such as n-octyl mercaptan, n-dodecyl mercaptan, tert-dodecyl mercaptan, and mercaptoethanol; terpenes; and halogenated hydrocarbons such as chloroform and carbon tetrachloride may be used.

Emulsifiers; preferably rosin acid salts such as potassium rosinate, sodium rosinate and the like; sodium and potassium salts of fatty acids such as potassium laurate, sodium laurate, sodium stearate, and potassium stearate; sulfate esters of fatty alcohols such as sodium lauryl sulfate; and alkylarylsulfonates such as sodium dodecylbenzenesulfonate may be used.

The composition distribution in the total free polymer in the present invention can be determined, for example, by the method described in Polymer Journal, Vol. 6, No. 6, 532–536 (1974) (described later in Example).

The thermoplastic resin (b) can be used in admixture of two or more within the scope of the invention.

The styrenic resins (c) suitable for use in the poly(phenylene ether)-containing composition of this invention are polymers of aromatic alkenyl compounds or copolymers of aromatic alkenyl compounds with other copolymerizable monomers. Said aromatic alkenyl compounds and copolymerizable monomers include all of the compounds exemplified above with respect to aromatic alkenyl compounds, alkenyl cyanide compounds, and copolymerizable alkenyl monomers suitable for use as the resin constituents. If necessary, the styrenic resins may contain rubber-like polymers.

Suitable styrenic resins include polystyrene, polychlorostyrene, poly-α-methylstyrene, styrene-acrylonitrile copolymer, styrene-methyl methacrylate copolymer, styrene-maleic anhydride copolymer, styrene-α-methylstyrene copolymer, styrene-α-methylstyrene-methyl methacrylate copolymer, styrene-α-methylstyrene-acrylonitrile-methyl methacrylate copolymer, and rubber-modified products thereof. These resins can be used alone or in admixture of two or more. The acrylonitrile content of the styrenic resin is 40% by weight or less, the methyl methacrylate content is 80% by weight or less, and the styrene content is 20% by weight or more. The proportion of the above styrenic resin in the thermoplastic resin composition of this invention is up to 94% by weight, preferably 2 to 85% by weight, more preferably 5 to 70% by weight, and particularly preferably 10 to 60% by weight. If the proportion exceeds 94% by weight, the composition becomes inferior in painting, heat resistance, impact resistance, and surface gloss of molded article.

The rubber-like polymer used in the rubber-modification of the styrenic resin (c) in this invention includes ethylene-α-olefin copolymers, ethylene-α-olefinpolyene terpolymers; diene rubbers such as polybutadiene, styrene-butadiene random copolymers and block copolymers, butadiene-isoprene copolymers and the like; acrylic rubbers; and the like.

The α-olefins used in the above-mentioned ethylene-α-olefin copolymer and ethylene-α-olefin-polyene terpolymers are hydrocarbon compounds having 3 to 20 carbon atoms, and include specifically propylene, butene-1, pentene-1, hexene-1, heptene-1, 4-methylbutene-1, 4-methylpentene-1, styrene, p-isopropylstyrene, vinylcyclohexane, and the like, among which propylene is particularly preferred. The above-mentioned polyenes include 1,4-pentadiene, 1,3-hexadiene, 2-methyl-1,5-hexadiene, 3,3-dimethyl-1,5-hexadiene, 1,7-octadiene, 1,9-decadiene, 6-methyl-1,5-hexadiene, 1,4-hexadiene, 7-methyl-1,6-octadiene, 9-methyl-1,9-undecene, isoprene, 1,3-pentadiene, 1,4,9-decatriene, 4-vinyl-1-cyclohexene, cyclopentadiene, 2-methyl-2,5-norbornadiene, 5-methylene-2-norbornene, 5-ethylidene-2-norbornene, 5-isopropylidene-2-norbornene, 5-isopropenyl-2-norbornene, dicyclopentadiene, tricyclopentadiene, and the like.

The above-mentioned acrylic rubbers are polymers obtained from at least one monomer selected from the group consisting of alkyl acrylates and methacrylates in which the alkyl group has 2 to 12 carbon atoms, and include specifically ethyl, butyl, hexyl, octyl, 2-ethylhexyl and lauryl acrylates and methacrylates and the like. In some cases, monomers copolymerizable with the alkyl acrylates and methacrylates may be used together with them. These copolymerizable monomers include ethylenically unsaturated monomers such as acrylonitrile, vinyltoluene, styrene, α-methylstyrene, p-methylstyrene and the like; conjugated diene monomers such as butadiene, isoprene, 2,3-dimethylbutadiene, piperylene, chloroprene and the like, and the above-mentioned polyene compounds, and the like. These monomers may be used alone or in admixture of two or more. The proportion between the alkyl acrylate or methacrylate and the monomers copolymerizable therewith is preferably 0 to 50 parts by weight of the latter per 100 to 50 parts by weight of the former. The above-mentioned rubber components may be used alone or in admixture of two or more.

The above-mentioned rubber component is used in the form of a latex, and the rubber polymer latex may be obtained by emulsion polymerization or by dissolving the rubber component in a solvent, and then adding a surfactant thereto to emulsify the solution.

The rubber-modified styrenic resin (c) used in this invention is preferably a graft copolymer in which (1) an aromatic alkenyl compound or (2) an aromatic alkenyl compound and an alkenyl cyanide and/or an unsaturated carboxylic acid ester and/or an unsaturated carboxylic acid are grafted on the rubber-like polymer, and the aromatic alkenyl compound content in the grafted resin polymer is 70% by weight or more, and it is preferred that this graft copolymer is contained in an amount of 2 to 50% by weight in the poly(phenylene ether) resin composition. The aromatic alkenyl compound, alkenyl cyanide, unsaturated carboxylic acid and unsaturated carboxylic acid ester mentioned above may be used each alone or in admixture of two or more, and all the examples mentioned above may be used.

The content of the unsaturated carboxylic acid or its ester is preferably 30% by weight or less, more preferably 15% by weight or less, and particularly preferably 5% by weight or less, based on the weight of the above-mentioned resin polymer.

The alkenyl cyanide compound content is preferably 15% by weight or less, more preferably 10% by weight or less, particularly preferably 4% by weight or less, and most preferably 0% by weight, based on the weight of the resin polymer in view of enhancing the thermal stability of the thermoplastic resin composition of this invention.

The aromatic alkenyl compound content is 70% by weight or more, preferably 85% by weight or more, more preferably 90% by weight or more, and particularly preferably 100% by weight, based on the weight of the resin polymer. If the aromatic alkenyl compound content is less than 70% by weight, the thermal stability becomes inferior. The rubber-like polymer content in the graft copolymer is preferably 5 to 70% by weight, more preferably 10 to 60% by weight, and particularly preferably 10 to 50% by weight, based on the weight of the graft copolymer.

The phase of the rubber-like polymer on which the resin polymer has been grafted is obtained by emulsion polymerization. When it is obtained by other methods than the emulsion polymerization, the surface gloss of molded article, painting, and thermal stability are inferior. The emulsifiers, polymerization initiator, molecular weight regulator and the like used in the emulsion polymerization may be those which are used in the production of the above-mentioned thermoplastic resins, and polymerization can be effected with the same formulation. As the polymerization initiator, particularly preferred are redox type initiators which are combinations of organic hydroperoxides, representatives of which are cumene hydroperoxide, diisopropylbenzene hydroperoxide and para-menthanehydroperoxide with a reducing agent, representatives of which are sugar-containing pyrophosphoric acid recipe, sulfoxylate recipe, a sugar-containing pyrophosphoric acid recipe/sulfoxylate recipe mixed recipe and the like.

When a rubber-like polymer is used in the styrenic resin (c), the amount of the resin polymer grafted on the rubber-like polymer, that is, the degree of grafting (solvent: methyl ethyl ketone) is preferably at least 10 parts by weight, more preferably 30 to 200 parts by weight, and particularly preferably 50 to 150 parts by weight, per 100 parts by weight of the rubber-like polymer in view of an improvement in impact resistance, surface glass of molded article, painting, heat resistance, thermal stability and processability. The thickness of the resin polymer grafted onto the rubber-like polymer is preferably in the range of from 100 to 200 Å from the viewpoint of the surface gloss of a molded article. The thickness of the grafted resin polymer can be determined from an electron photomicrograph according to the common method for observing the outer grafted resin polymer.

In the grafting of the resin constituents onto a rubber-like polymer by emulsion polymerization, the rubber-like polymer is used in the latex form. A rubber-like polymer latex produced by emulsion polymerization can be used. It is also possible to use a rubber-like polymer latex formed by dissolving in the monomer and/or a solvent a solid rubber-like polymer obtained by other methods, and then emulsifying the resulting solution.

The average particle size of the rubbery polymer dispersed in the poly(phenylene ether) resin composition of this invention is 0.05 to 0.8μ, preferably 0.05 to 0.5μ, and more preferably 0.05 to 0.45μ. If the particle size is less than 0.05μ, the impact resistance and the surface gloss of molded article are inferior. If it exceeds 0.8μ, the thermal stability, the surface gloss of molded article and polymerization stability becomes inferior.

A preferred rubber-like polymer latex suitable for use in the present resin composition is (1) a latex in which 70% by weight or more of the particles have a size of 500 Å to 1,730 Å and the content of gel (toluene insolubles; the same applies hereinafter) is 50% by weight or more, (2) a latex in which 70% by weight or more of the particles have a size of 1,730 Å to 4,400 Å and the gel content is 60% by weight or more, (3) a latex in which 50% by weight or more of the particles have a size of 4,400 Å or more, and the gel content is 70 to 20% by weight, (4) a mixture of the latices (1) and (2) in a weight ratio of 5-50 to 95-50%, (5) a mixture of the latices (2) and (3) in a weight ratio of 95-5 to 5-95, or (6) a mixture of the latices (1), (2) and (3) in a ratio of 10-60:80-30:50-60. When the rubber-like polymer latex of (1), (4) or (6) is used, in particular, the orienting crack in drop weight impact is not caused, and a very stable impact strength is exhibited. Moreover, when the rubber-like polymer latex of (2) or (4) is used, the surface gloss of molded article and the painting are good.

Other styrenic resins (c) than the above-mentioned rubber-modified styrenic resins are copolymers of aromatic alkenyl compounds with other alkenyl monomers copolymerizable therewith, and the alkenyl monomers copolymerizable with the aromatic alkenyl compound include the above-mentioned alkenyl cyanide compounds, alkyl acrylates and methacrylates, unsaturated acids and the like. In addition, unsaturated acid anhydrides such as maleic anhydride, itaconic anhydride, citraconic anhydride and the like may be used as the copolymerizable monomer. As these monomers, all the above-mentioned monomers are used. Preferable examples of the styrenic resin (c) are polystyrene, styrene-acrylonitrile copolymers, styrene-methacrylic acid copolymer, styrene-methyl methacrylate copolymer, styrene-maleic anhydride copolymer, styrene-α-methylstyrene-acrylonitrilemethyl methacrylate copolymer, and the like. In particular, polystyrene is preferred.

Of these styrenic resins (c), preferred are polystyrene and rubber-modified polystyrene, namely the so-called high impact polystyrene in which styrene is graft-copolymerized on a rubber-like polymer.

Particularly, compositions in which a high impact polystyrene is used as an essential component, namely a composition consisting of
(a) poly(phenylene ether),
(b) the above-mentioned thermoplastic resin consisting of copolymers having a composition distribution of bound acrylonitrile content,
(c) a high impact polystyrene,
are particularly preferred because a composition excellent in heat resistance, impact resistance, surface gloss of molded article, painting and thermal stability is obtained.

In the above-mentioned combination of (a), (b) and (c), preferable compositions contain (d) polystyrene in addition to (a), (b) and (c). The weight ratio of (a)/(b)/(c)/(d) is 5–95/1–60/2–50/0–92, preferably 10–60/5–50/5–40/5–90, and more preferably 10–60/5–30/5–30/7–60.

When as a method for improving the thermal stability which is one of the objects of this invention, there is adopted a method by which in emulsion-polymerizing an aromatic alkenyl compound or the like in the presence of a rubber-like polymer, an antioxidant is dissolved in the monomer before the initiation of the polymerization, and the monomer having dissolved therein the rubber-like polymer and the antioxidant is stirred in the polymerization system at a temperature ranging from room temperature to 80° C., after which the monomer is polymerized, a composition having a good thermal stability can be obtained. Poly(phenylene ether) resin compositions containing the thermoplastic resin thus obtained are also included in this invention. In the above method, when the rubber-like polymer is contacted with the monomer having dissolved therein the antioxidant, it is desirable to reduce the amount of the emulsifier as small as possible and add a small amount of a water-soluble organic solvent, for example, acetone because this results in a composition having a better thermal stability. The antioxidant used in the above method may be any of the conventionally used known antioxidants, which may or may not have a vinyl linkage, though an antioxidant having a vinyl linkage is preferred.

The poly(phenylene ether) resin composition of this invention can be obtained by mixing the above-mentioned components by solution-blending, an extruder, a Banbury mixer, a kneader or the like.

The thermoplastic resin composition of this invention comprising the poly(phenylene ether) (a) and the thermoplastic resin (b) and if necessary, the styrene resin (c) is prepared by, for example, any of the following methods:
(1) A mixing method comprising dissolving or swelling each component in or with an organic solvent.
(2) A method comprising mixing each component in a mixer or the like, melt-mixing the resulting mixture in an extruder and then pelletizing the same.
(3) A method comprising adding a nonsolvent to the mixture obtained in (1) above to recover a powder mixture, melt-mixing the powder mixture in an extruder and then pelletizing the same.

(4) A method comprising adding to the pellets obtained in (3) above a thermoplastic resin, a styrenic resin, a poly(phenylene ether) or the like, mixing them in a mixer or the like, melt-mixing the resulting mixture in an extruder and then pelletizing the same.

(5) A method comprising subjecting to injection molding the pellets or powder obtained in (1) to (4) above alone or in admixture with each other or with other components, to form a molded article.

The above treatment can be performed by means of known mixing machines such as Banbury mixer and kneader. It is also possible to mix the above pellets with a thermoplastic resin, a styrenic resin, a poly(phenylene ether), or other resins and melt-mix the resulting mixture in an extruder to produce a composition. The present thermoplastic resin composition thus produced can be processed by injection molding, sheet extrusion, vacuum forming, profile extrusion, and foam molding to obtain various shaped articles.

In the use of the present thermoplastic resin composition, it may be blended with antioxidants, UV absorbers, lubricants, plasticizers, flame retardants, anti-statics, foaming agents, and glass fiber which are in common use.

Effective flame retardants for the present thermoplastic resin composition are compounds containing a halogen such as bromine or chlorine; phosphate compounds; triazine compounds; or the like, and these may suitably be used in combination with an auxiliary flame retardant such as antimony trioxide or the like. The phosphate compounds are particularly preferred.

Lubricants and plasticizers suitable for use in the present invention include higher alcohols and their derivatives, polyorganosiloxanes, paraffins, waxes, fatty acids, amide compounds, ketones, mineral oils, vegetable oils, low-molecular-weight styrenic polymers, metal soaps, amines, organic phosphite compounds, hydrazine compounds, aromatic acid derivatives, fatty acid derivatives, and sulfonic acid derivatives. At least one substance selected from these materials may be used.

Preferred lubricants are fatty acids, amide compounds, paraffin and waxes, higher alcohols, mineral oils, polyorganosiloxanes, low-molecular-weight polystyrene, metal soaps, and styrene-acrylonitrile dimer. Of these, most preferred are higher alcohols, polyorganosiloxanes, and metal soaps. Preferred plasticizers are organic phosphite compounds, hydrazine compounds, trimellitic acid derivatives, isophthalic acid derivatives, and stearic acid derivatives. Of these, especially preferred are organic phosphite compounds and hydrazine compounds.

The lubricant or plasticizer is used in an amount of 0.0001 to 10 parts by weight per 100 parts by weight of total resin component in view of processability, heat resistance, and mechanical strengths. Except for special lubricants, the amount is preferably 0.001 to 10, more preferably 0.01 to 10, and most preferably 0.01 to 5, parts by weight.

Further, to comply with the required performance characteristics, the present resin composition may be blended with other known polymers such as, for example, ABS resin, AS resin, polystyrene, rubber-modified polystyrene, styrene-methyl methacrylate copolymer, styrene-maleic anhydride copolymer, polybutadiene, butadiene-styrene copolymer, polyphenylene ether, acrylic rubber, ethylene-propylene copolymer, EPDM, styrene-butadiene block copolymer, styrene-butadiene-styrene block copolymer, styrene-butadiene-styrene radial block polymer, hydrogenated products of these block polymers, polypropylene, butadiene-acrylonitrile copolymer, polyvinyl chloride, polycarbonate, PET, PBT, polyacetal, polyamide, epoxy resin, polyvinylidene fluoride, polysulfone, ethylene-vinyl acetate copolymer, polyisoprene, natural rubber, chlorinated butyl rubber, chlorinated polyethylene, PPS resin, polyether etherketone.

DESCRIPTION OF THE PREFERRED EMBODIMENTS

The invention is illustrated below in further detail with reference to Preparative Examples and Examples which are merely illustrative and not limitative. In the following Examples all parts and percentages are by weight, unless otherwise specified.

PREPARATIVE EXAMPLE

A poly(phenylene ether) for use in Examples and Comparative Examples was prepared in the following manner:

Preparation of poly(phenylene ether) (Polymer A-1)

Into a stainless steel reactor provided with an oxygen-blowing means at the bottom, a cooling coil, and a stirrer, which had been thoroughly purged with nitrogen, were charged 53.6 g of cupric bromide, 1,110 g of di-n-butylamine, and a solution of 8.75 kg of 2,6-xylenol in 40 liters of toluene. The mixture was stirred to form a uniform solution, and polymerization was carried out for 120 minutes while rapidly feeding oxygen into the reactor. During the polymerization, the temperature of the mixture was maintained at 30° C. by circulating water through the cooling coil. At the end of the polymerization time, 30 liters of toluene was added to the polymerization mixture, and a 20% aqueous solution of 430 g of tri-sodium ethylenediaminetetraacetate was then added thereto to terminate the polymerization. The polymer solution phase was separated by centrifugation. Methanol was added gradually to the polymer solution with vigorous stirring to form a slurry. The polymer was collected by filtration, washed thoroughly with methanol, filtered again, and dried to obtain Polymer A-1.

Preparation of poly(phenylene ether) (Polymer A-2)

The same procedure as in the preparation of Polymer A-1 was repeated, except that 2,6-xylenol/2,3,6-trimethylphenol=90/10 (molar ratio) was substituted for the phenol compound (2,6-xylenol) to obtain Polymer A-2.

Preparation of thermoplastic resins and styrenic resins

The polybutadiene rubber-like polymer latex (No. 1) shown in Table 1 for use in the preparation of thermoplastic resins and styrenic resins was obtained by emulsion polymerization.

TABLE 1

| Rubber-like polymer latex No. | Particle diameter of polybutadiene latex | Gel content (%) |
|---|---|---|
| 1 | 1730Å–4400Å 85.1% | 80 |

The latex particle size shown in Table 1 was determined by a creaming method using sodium alginate (the percentage shown in Table 1 means the proportion of particles having the specified particle diameter range). The gel content means the weight % of toluene insoluble matter obtained by coagulating the latex, drying the coagulum, dissolving the coagulum in toluene at room temperature (20° C.) for 20 hours, and filtering the resulting mixture through a 100-mesh screen.

Thermoplastic resins and styrenic resins (Polymer B) for use in Examples and Comparative Examples were prepared by emulsion polymerization using the rubber-like polymer latex shown in Table 1, styrene, and acrylonitrile with the recipe shown in Table 2. The polymerization of B-1 was conducted in three steps. The first step is a batchwise polymerization, and in the second and third steps, polymerization was conducted by continuously adding the monomers until the polymerization conversion finally reached nearly 100%.

(3) Surface gloss: The surface gloss of molded article was visually evaluated according to the following criteria:
⊚: Excellent
◉: Good
Δ: Fair
x: Poor (4) Painting: The molded article (plate form) was coated using the following coating material produced by Origin Electric Co., Ltd. and thinner.
Coating material: "Planet AH" (trade name).
Thinner: "Planet #201" (trade name)
The coated surface was visually inspected with respect to cracking, crazing, absorption, and appearance and evaluated according to the following criteria:

TABLE 2

| Polymer B | Rubber-like polymer latex Amount (parts) | Acrylo-nitrile content*[1] (%) | Distribution of polymers different in acrylonitrile content in total free polymer (%) | | | |
|---|---|---|---|---|---|---|
| | | | 1% or more but less than 10% | 10% or more but less than 20% | 20% or more but less than 40% | 40% or more |
| B-1 | — | 25 | 8 | 12 | 80 | 0 |
| B-2 | 40 | 25*[2] | 0 | 0 | 100 | 0 |
| B-3 | 40 | 5*[2] | 100 | 0 | 0 | 0 |
| B-4 | — | 25 | 0 | 0 | 100 | 0 |
| B-5 | — | 0 | 0 | 0 | 0 | 0 |
| B-6 | 10 | 0 | 0 | 0 | 0 | 0 |
| B-7 | 40 | 50*[2] | 2 | 10 | 30 | 60 |

Note:
B-5 was polystyrene
B-6 was a rubber-modified polystyrene in which the base rubber is polybutadiene (high impact polystyrene).
B-1 to B-3 and B-7 were prepared by emulsion polymerization
B-4 to B-6 were prepared by solution polymerization.
*[1]Determined from the results of nitrogen analysis.
*[2]The acrylonitrile content of the total free polymer (methyl ethyl ketone soluble matter) determined from the results of nitrogen analysis.
**The distribution of polymers different in acrylonitrile content in the total free polymer was determined by dissolving in methyl ethyl ketone a certain amount of a methyl ethyl ketone soluble matter, adding to the resulting solution cyclohexane in small portions, fractionating the precipitated polymer in each stage, measuring the weight of each precipitated polymer and calculating the acrylonitrile content of the polymer from the results of nitrogen analysis.

EXAMPLES 1 AND 2 AND COMPARATIVE EXAMPLES 1 TO 3

The polymers described previously were blended in the ratio shown in Table 3. Each blend was extruded from a twin-screw kneader-extruder at 260° to 300° C. and pelletized. The thoroughly dried pellets were molded at 240° to 280° C. by means of an injection molding machine to obtain test specimens for testing impact resistance, heat resistance, surface gloss, painting, and solvent resistance. The results obtained by measurement in the following test manner are shown in Table 3.

Method of Evaluation (1) Heast resistance: The test specimen of ¼ inch in thickness was annealed at 110° C. for 2 hours, and the deflection temperature under a load of 264 psi was measured according to the method of ASTM D-648.
(2) Impact resistance: Measurement was performed on a notched specimen of ¼ inch in thickness according to the method of ASTM D-256.

⊚: Excellent
◉: Good
Δ: Fair
x: Poor (5) Chemical resistance: The specimen for testing the deflection temperature under load was immersed in gasoline for 5 hours. Then the surface was inspected for cracking and the swelling degree was measured. The appearance was visually inspected with respect to cracking and evaluated according to the following criteria:
⊚: Excellent
◉: Good
Δ: Fair
x: Poor $$\text{Degree of swelling in gasoline (\%)} = \frac{\begin{pmatrix}\text{Weight after}\\ \text{immersion in}\\ \text{gasoline for}\\ \text{5 hours}\end{pmatrix} - \begin{pmatrix}\text{Weight before}\\ \text{immersion in}\\ \text{gasoline}\end{pmatrix}}{\text{Weight before immersion in gasoline}} \times 100$$

TABLE 3

| | Blending ratio parts | | | | | Result of evaluation | | | | | |
|---|---|---|---|---|---|---|---|---|---|---|---|
| | | | | | | | | | Solvent resistance | | |
| | Polymer A-1 (parts) | Thermoplastic resin Polymer | Parts | Styrenic resin Polymer | Parts | Rubber content (%) | Impact resistance (kg · cm/cm) | Deflection temperature (°C.) | Gloss | Appearance | Swelling degree (%) | Painting |
| Example 1 | 40 | B-1 | 15 | B-2 / B-5 | 30 / 15 | 12 | 30 | 139 | ⊚ | ⊚ | 3 | ⊚ |
| Example 2 | 40 | B-1 | 15 | B-3 | 45 | 18 | 37 | 136 | ⊚ | ⊚ | 3 | ⊚ |
| Comparative Example 1 | 40 | | | B-6 | 60 | 6 | 12 | 112 | x | x | 12 | x |
| Comparative Example 2 | 40 | | | B-2 / B-4 / B-5 | 4.5 / 7.5 / 7.5 | 18 | 6 | 92 | x | x | 8 | x |
| Comparative Example 3 | 40 | B-7 | 45 | B-4 / B-5 | 7.5 / 7.5 | 18 | 16 | 107 | x | O | 4 | Δ |

EXAMPLES 3 TO 13 AND COMPARATIVE EXAMPLES 4 TO 11

Preparation of Polymer B-8 (polybutadiene-styrene copolymer)

A stainless steel reactor provided with a stirrer was sufficiently purged with nitrogen, and 4,000 g (as solids) of polybutadiene latex (JSR #0700 produced by Japan Synthetic Rubber Co., Ltd., particle size: 0.2–0.3μ), 12 g of potassium hydroxide, 2,500 g of styrene and 14,000 g of ion-exchanged water were charged into the reactor, after which the resulting mixture was thoroughly stirred and the temperature of the mixture was elevated while circulating hot water at 70° C. into the jacket of the reactor. When the temperature of the mixture reached 50° C., an aqueous solution of 20 g of pyrophosphoric acid, 25 g of grape sugar and 0.4 g of ferrous sulfate in 950 g of ion-exchanged water and 25.2 g of cumene hydroperoxide were added to the mixture, after which the resulting mixture was subjected to polymerization for 2 hours. Thereafter, an emulsion consisting of 3,500 g of styrene, 25 g (as solids) of sodium dodecylbenzenesulfonate, 18 g of potassium hydroxide, 5,000 g of ion-exchanged water and 25.2 g of cumene hydroperoxide was added continuously to the reaction mixture over 3 hours, while conducting the polymerization of the mixture. After the completion of the addition of the emulsion, a solution of 6.7 g of pyrophosphoric acid, 8.3 g of grape sugar and 0.13 g of ferrous sulfate in 317 g of ion-exchanged water and 7 g of cumene hydroperoxide were added to the polymerization mixture, and the resulting mixture was subjected to polymerization for one hour to complete the polymerization. After the addition of an antioxidant to the polymerization mixture, the mixture was coagulated with calcium chloride, and then dried to obtain Polymer B-8.

Preparation of Polymer B-9 (styrene-butadiene copolymer rubber-styrene copolymer)

The same procedure as in the preparation of Polymer B-8 was repeated, except that a styrene-butadiene copolymer latex (particle size: 0.07–0.09μ) was substituted for the polybutadiene latex, to obtain Polymer B-9.

Preparation of Polymer B-10 (stvrene-butadiene copolymer rubber-styrene copolymer)

The same procedure as in the preparation of Polymer B-8 was repeated, except that a styrene-butadiene copolymer latex (JSR #0561 produced by Japan Synthetic Rubber Co., Ltd., particle size: 0.5–0.7μ) was substituted for the polybutadiene latex, to obtain Polymer B-10.

Preparation of Polymer B-11 (polybutadiene/styrene-butadiene copolymer-styrene copolymer)

The same procedure as in the preparation of Polymer B-8 was repeated, except that a polybutadiene latex (JSR #0700 produced by Japan Synthetic Rubber Co., Ltd.)/styrene-butadiene copolymer latex (particle size: 0.07–0.09μ)=50/50 (weight ratio) was substituted for the polybutadiene latex, to obtain Polymer B-11.

Preparation of Polymer B-12 (polybutadiene-styrene-acrylonitrile copolymer)

A stainless steel reactor provided with a stirrer was sufficiently purged with nitrogen, and 1,374 g of acrylonitrile, 2,010 g of styrene, 25 g (as solids) of sodium dodecylbenzenesulfonate, 1 g of potassium hydroxide, 10,300 g of ion-exchanged water and 12.4 g of tert.-dodecylmercaptan were charged thereinto, after which the resulting mixture was thoroughly stirred, and the temperature of the mixture was elevated while circulating hot water at 70° C. into the jacket of the reactor. When the temperature of the mixture reached 40° C., a solution of 20 g of sodium pyrophosphate, 25 g of grape sugar and 0.4 g of ferrous sulfate in 950 g of ion-exchanged water and 7.4 g of cumene hydroperoxide were added to the mixture, and the resulting mixture was subjected to first stage polymerization for 2 hours. Subsequently, an emulsion consisting of 1,140 g of styrene, 80.4 g of acrylonitrile, 1.2 g of tert.-dodecylmercaptan, 23 g (as solids) of sodium dodecylbenzenesulfonate, 0.92 g of potassium hydroxide, 2,300 g of ion-exchanged water, and 3.6 g of cumene hydroperoxide was continuously added over 2 hours to conduct the polymerization. In this second stage polymerization, when the first one hour had elapsed, 4,000 g (as solids) of a polybutadiene latex (JSR #0700 produced by Japan Synthetic Rubber Co., Ltd.) was added to conduct the second stage polymerization. Further, an emulsion consisting of 1,350 g of styrene, 45.6 g of acrylonitrile, 1.4 g of tert.-dodecylmercaptan, 50 g of sodium dodecylbenzenesulfonate, 1 g of potassium hydroxide, 2,700 g of ion-exchanged water and 7.5 g of cumene hydroperoxide was continuously added over 2 hours to conduct the third stage polymerization. Subsequently, a solution of 6.7 g of sodium pyrophosphate, 8.3 g of grape sugar, and 0.13 g of ferrous sulfate in 317 g of ion-exchanged water and 7 g of cumene hydroperoxide were added, after which the resulting mixture was subjected to polymerization to complete the polymerization. In the same manner as in the preparation of Polymer B-8, the polymer thus formed was recovered to obtain Polymer B-12.

Preparation of Polymer B-13
(polybutadiene-styrene-acrylonitrile copolymer)

A stainless steel reactor provided with a stirrer was sufficiently purged with nitrogen, and thereafter, 4,000 g (as solids) of a polybutadiene latex (JSR #0700 produced by Japan Synthetic Rubber Co., Ltd.), 1,480 g of styrene, 520 g of acrylonitrile, 30 g (as solids) of sodium dodecylbenzenesulfonate, 1 g of potassium hydroxide, 10,300 g of ion-exchanged water and 12.4 g of tert.-dodecylmercaptan were charged into the reactor, after which the resulting mixture was thoroughly stirred, and the temperature of the mixture was elevated while circulating hot water at 70° C. into the jacket of the reactor. When the temperature of the mixture reached 40° C., a solution of 20 g of sodium pyrophosphate, 25 g of grape sugar and 4 g of ferrous sulfate in 950 g of ion-exchanged water and 7.4 g of cumene hydroperoxide were added to the mixture, after which the resulting mixture was subjected to polymerization for 2 hours. Subsequently, an emulsion consisting of 2,960 g of styrene, 1,040 g of acrylonitrile, 2.6 g of tert.-dodecylmercaptan, 50 g (as solids) of sodium dodecylbenzenesulfonate, 1.92 g of potassium hydroxide, 5,000 g of ion-exchanged water and 11.1 g of cumene hydroperoxide was continuously added over 3 hours to conduct the polymerization. Subsequently, a solution of 6.7 g of pyrophosphoric acid, 8.3 g of grape sugar and 0.13 g of ferrous sulfate in 317 g of ion-exchanged water and 7 g of cumene hydroperoxide were added, after which the resulting mixture was subjected to polymerization for one hour to complete the polymerization. In the same manner as in the preparation of Polymer B-8, the resulting polymer was recovered to obtain Polymer B-13.

Preparation of Polymer B-14 (polybutadiene-styrene copolymer)

A stainless steel reactor provided with a paddle type stirrer was purged with nitrogen, and thereafter, 2.8 kg of polybutadiene (JSR-BRO2L produced by Japan Synthetic Rubber Co., Ltd.), 17.2 g of styrene and 22 g of toluene were charged into the reactor, after which the resulting mixture was stirred at 50° C. until the rubber was completely dissolved. Thereafter, 20 g of tert.-dodecylmercaptan, 40 g of benzoylperoxide, 40 g of tert.-butylperoxy-1-propyl carbonate, and 20 g of dicumyl peroxide were added to the mixture, after which the temperature of the mixture was elevated and the resulting mixture was subjected to polymerization at 80° C. for 3 hours, then at 100° C. for 3 hours and finally at 125° C. until the polymerization conversion reached 100%. The resulting polymer was subjected to an extruder to pelletize the polymer to obtain Polymer B-14.

The average particle size of the rubber in the polymer was 1 to 2μ.

Preparation of Polymer B-15 (polybutadiene-styrene copolymer)

The same procedure as in the preparation of Polymer B-14 was repeated, except that the stirring at the time of phase-conversion was made stronger, to obtain Polymer B-15 having an average particle size of 0.5 to 0.6μ.

As to the Polymer B-12 and Polymer B-14, which are polymers containing acrylonitrile, the acrylonitrile content in the graft phase was measured in the following manner:

Acrylonitrile content in the graft phase

One gram of each of Polymer B-12 and Polymer B-13 was weighed and then dissolved in 25 ml of methyl ethyl ketone by shaking for 24 hours, and the resulting solution was subjected to centrifuge at 23,000 rpm. to separate it into methyl ethyl ketone-solubles and methyl ethyl ketone-insolubles. The methyl ethyl ketone-solubles were dried and subjected to IR spectrometer; however, no absorption due to polybutadiene was observed.

The methyl ethyl ketone-insolubles were dried and subjected to measurement of the weight fraction. Further, the insolubles were subjected to analysis of nitrogen. From the results of the two measurements, the acrylonitrile content was determined and then the acrylonitrile content in the graft phase was determined. The results thereof were as follows:

The acrylonitrile content in the graft phase of Polymer B-12 was 3.5%.

The acrylonitrile content in the graft phase of Polymer B-13 was 25%.

Thermoplastic resins to be used in the Examples and Comparative Examples were prepared in the following manner:

Preparation of Polymers B-16 to B-20

The same procedure as in the preparation of Polymer B-12 was repeated, except that the polymerization was conducted without using the rubber-like polymer, namely, while changing the styrene/acrylonitrile ratio in each polymerization stage, to obtain Polymers B-16 to B-20.

In the same manner, thermoplastic resins were obtained by varying the number of steps of polymerization and the styrene/acrylonitrile ratio in each step of polymerization. The results are shown in Table 4.

TABLE 4

| | Thermoplastic resin | Composition distribution of acrylonitrile in thermoplastic resin (%)** | | | |
|---|---|---|---|---|---|
| Polymer | Acrylonitrile content in resin (%)* | 1% or more but less than 10% | 10% or more but less than 20% | 20% or more but less than 40% | 40% or more |
| B-16 | 25 | 8 | 12 | 80 | 0 |
| B-17 | 20 | 15 | 38 | 40 | 0 |
| B-18 | 25 | 0 | 0 | 100 | 0 |
| B-19 | 25 | 0 | 10 | 90 | 0 |

TABLE 4-continued

| Polymer | Thermoplastic resin Acrylonitrile content in resin (%)* | Composition distribution of acrylonitrile in thermoplastic resin (%)** | | | |
|---|---|---|---|---|---|
| | | 1% or more but less than 10% | 10% or more but less than 20% | 20% or more but less than 40% | 40% or more |
| B-20 | 15 | 1 | 99 | 0 | 0 |

Note:
*The acrylonitrile content in the thermoplastic resin was determined by nitrogen analysis.
**The composition distribution of acrylonitrile in the thermoplastic resin was determined by dissolving the thermoplastic resin in a given amount of methyl ethyl ketone, portionwise adding cyclohexane to the resulting uniform solution, to precipitatethe polymer, and measuring the weight of the polymer and the acrylonitrile content by nitrogen analysis.

Preparation of polystyrene

As the polystyrene resins to be used in the Examples and Comparative Examples, polystyrene was prepared by solution polymerization.

The above-mentioned vaious polymers were mixed according to the recipes shown in Table 5, and the resulting mixture were subjected to a twin-screw extruder to pelletize them, and the resulting pellets were dried sufficiently and then subjected to an injection machine at a cylinder temperature of 280° C. at a mold temperature of 50° C. to form test pieces for impact resistance, heat resistance, surface gloss, thermal stability and painting. These properties were measured according to the following test methods to obtain the results shown in Table 5.

Test method

Thermal stability

Each of the various poly(phenylene ether) resin compositions was subjected to an injection machine at a residence time of 15 minutes at a cylinder temperature of 280° C. to form test pieces for measurement of impact resistance, and the notched test pieces having a thickness of ¼ inch were subjected to measurement according to ASTM D-256.

The other tests were made in the same manner as in Examples 1 and 2.

As is clear from Table 5, the poly(phenylene ether) resin compositions of the present invention are endowed with all of heat resistance, impact resistance, thermal stability, painting and surface gloss of molded article.

TABLE 5

| | Blending components | | | | | | | Evaluation results | | | | |
|---|---|---|---|---|---|---|---|---|---|---|---|---|
| | Polymer (a) | | Polymer (b) | | Polymer (c) | | Polymer (d) Poly-ethylene | Rubber Amount | Heat resistance (°C.) | Impact resistance (kg · cm/cm) | Thermal stability (kg · cm/cm) | Painting | Surface gloss (%) |
| | Kind | Amount | Kind | Amount | Kind | Amount | | | | | | | |
| Example 3 | A-1 | 40 | B-16 | 25 | B-8 | 25 | 10 | 10 | 125 | 18 | 17 | ◉ | 85 |
| Example 4 | A-2 | 40 | B-16 | 25 | B-8 | 25 | 10 | 10 | 126 | 20 | 19 | ◉ | 86 |
| Example 5 | A-2 | 40 | B-16 | 25 | B-9 | 25 | 10 | 10 | 126 | 15 | 14 | ◉ | 88 |
| Example 6 | A-2 | 40 | B-16 | 25 | B-10 | 25 | 10 | 10 | 126 | 26 | 21 | ○ | 82 |
| Example 7 | A-2 | 40 | B-16 | 25 | B-11 | 25 | 10 | 10 | 126 | 18 | 17 | ◉ | 87 |
| Example 8 | A-2 | 40 | B-16 | 10 | B-12 | 25 | 25 | 10 | 126 | 22 | 20 | ◉ | 87 |
| Example 9 | A-1 | 40 | B-17 | 25 | B-8 | 25 | 10 | 10 | 125 | 18 | 17 | ◉ | 85 |
| Example 10 | A-1 | 40 | B-16 | 20 | B-8 | 35 | 5 | 14 | 125 | 28 | 25 | ◉ | 83 |
| Example 11 | A-1 | 60 | B-16 | 5 | B-8 | 25 | 10 | 10 | 148 | 17 | 15. | ○ | 83 |
| Example 12 | A-1 | 20 | B-16 | 50 | B-8 | 25 | 5 | 10 | 113 | 17 | 15 | ◉ | 89 |
| Example 13 | A-1 | 40 | B-16 | 25 | B-8 | 21 | 14 | 8.4 | 125 | 16 | 15 | ◉ | 85 |
| Comparative Example 4 | A-1 | 40 | B-16 | 25 | B-13 | 25 | 10 | 10 | 127 | 20 | 5 | ◉ | 85 |
| Comparative Example 5 | A-1 | 40 | — | 0 | B-14 | 60 | — | 8.4 | 122 | 14 | 9 | x | 40 |
| Comparative Example 6 | A-1 | 40 | — | 0 | B-15 | 60 | — | 8.4 | 122 | 12 | 7 | △ | 70 |
| Comparative Example 7 | A-1 | 40 | B-18 | 25 | B-8 | 25 | 10 | 10 | 108 | 6 | 4 | x | 52 |
| Comparative Example 8 | A-1 | 40 | B-19 | 25 | B-8 | 25 | 10 | 10 | 110 | 8 | 5 | x | 60 |
| Comparative Example 9 | A-1 | 40 | B-20 | 25 | B-8 | 25 | 10 | 10 | 111 | 9 | 5 | x | 60 |
| Comparative Example 10 | A-1 | 100 | — | 0 | — | 0 | — | 0.8 | 190 | 6 | 4 | x | 64 |
| Comparative Example 11 | A-1 | 2 | B-16 | 25 | B-8 | 25 | 48 | 10 | 89 | 10 | 8 | ○ | 85 |

What is claimed is:

1. A thermoplastic resin composition comprising (a) 5 to 99% by weight of a poly(phenylene ether), (b) 95 to 1% by weight of a thermoplastic resin which is obtained by polymerizing, in the absence of a rubber-like polymer, an aromatic alkenyl compound and an alkenyl cyanide compound, while varying the weight ratio of the two in the polymerization, and (c) 2 to 94% by weight of other different styrenic resins other than thermoplastic resin (b) selected from the group consisting of homopolymer and copolymers of styrene and rubber-modified polymers obtained by homopolymerizing or copolymerizing styrene in the presence of a rubber-like polymer, said thermoplastic resin (b) comprising (A) 1–50% by weight of a polymer having an alkenyl cyanide compound content of 1% or more but less than 10% by weight, (B) 1-70% by weight of a polymer having an alkenyl cyanide compound content of 10% or more but less than 20% by weight, (C) 5-90% by weight of a polymer having an alkenyl cyanide compound content of 20% or more but less than 40% by weight.

2. A thermoplastic resin composition according to claim 1, wherein the poly(phenylene ether) (a) is a compound obtained by the oxidative coupling polymerization of at least one phenolic compound represented by the formula,

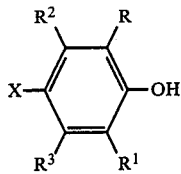

wherein X is a hydrogen atom, chlorine, bromine, or iodine; R is a monovalent sustituent selected from the group consisting of hydrocarbon groups, hydrocarbonoxy groups, halohydrocarbon groups having at least 2 carbon atoms between the halogen atom and the phenol nucleus, and halohydrocarbonoxy groups having at least 2 carbon atoms between the halogen atom and the phenol nucleus; $R^1$ is the same as R or a halogen atom; each of $R^2$ and $R^3$ is the same as $R^1$ or a hydrogen atom, provided that R, $R^1$, $R^2$, and $R^3$ are free from tertiary carbon atom.

3. A thermoplastic resin composition according to claim 2, wherein the phenolic compound is a compound represented by the formula,

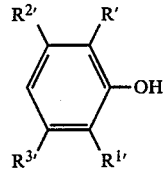

wherein each of R' and $R^{1'}$ is a monovalent hydrocarbon group having 1 to 8 carbon atoms; and each of $R^{2'}$ and $R^{3'}$ is a monovalent hydrocarbon group having 1 to 8 carbon atoms or a hydrogen atom.

4. A thermoplastic resin composition according to claim 2, wherein the phenolic compound is at least one compound selected from the group consisting of 2,6-dimethylphenol, 2,6-diethylphenol, 2-methyl-6-ethylphenol, 2-methyl-6-allylphenol, 2-methyl-6-phenylphenol, 2,6-diphenylphenol, 2,6-dibutylphenol, 2-methyl-6-propylphenol, 2,3,6-trimethylphenol, and 2,3-dimethyl-6-ethylphenol.

5. A thermoplastic resin composition according to claim 1, wherein the poly(phenylene ether) (a) has an intrinsic viscosity of 0.2 to 1 dl/g as measured in chloroform at 30° C.

6. A thermoplastic resin composition according to claim 1, wherein the amount of the poly(phenylene ether) (a) is 10 to 60% by weight.

7. A thermoplastic resin composition according to claim 1, wherein the other different styrenic resins (c) is at least one polymer selected from the group consisting of homopolymer of styrene, polychlorostyrene, poly-α-methylstyrene, styrene-acrylonitrile copolymer, styrene-methyl methacrylate copolymer, styrene-α-methylstyrene copolymer, styrene-α-methylstyrene-acrylonitrile-methyl methacrylate copolymer, and rubber-modified products thereof.

8. A thermoplastic resin composition according to claim 1, wherein the other different styrenic resins (c) is a homopolymer of styrene, a rubber-modified product thereof or a mixture of the two.

9. A thermoplastic resin composition according to claim 1, wherein the thermoplastic resin (b) has an intrinsic viscosity of 0.1 to 1.5 dl/g as measured in methyl ethyl ketone at 30° C.

10. A thermoplastic resin composition according to claim 7, wherein the rubber of the rubber-modified products is a poly-α-olefin, an ethylene-α-olefin-copolymer, an ethylene-unsaturated carboxylate ester copolymer, an ethylene-saturated fatty acvid vinyl ester copolymer, an ethylene-propylene nonconjugated diene terpolymer, a conjugated diene rubber, acrylic rubber, or a hydrogenation product of an alkenylbenzene-diolefin block copolymer.

11. A thermoplastic resin composition according to claim 7, wherein the rubber of the rubber-modified products is an ethylene-propylene-nonconjugated diene terpolymer, acrylic rubber, or a conjugated diene rubber.

12. A thermoplastic resin composition according to claim 7, wherein the rubber of the rubber-modified products is a polybutadiene, acrylic rubber, or a styrene-butadiene copolymer.

13. A thermoplastic resin composition according to claim 7, wherein the rubber of the rubber-modified products contains 10% by weight or more of a toluene insoluble matter.

14. A thermoplastic resin composition according to claim 1, wherein the aromatic alkenyl compound is at least one compound selected from the group consisting of styrene, a-methylstyrene, vinyltoluene, vinylxylene, monochlorostyrene, p-tert-butylstyrene, ethylstyrene, and vinylnaphthalene.

15. A thermoplastic resin composition according to claim 1, wherein the aromatic alkenyl compound is styrene.

16. A thermoplastic resin composition according to claim 1, wherein the alkenyl cyanide compound is acrylonitrile or methacrylonitrile.

17. A thermoplastic resin composition according to claim 15, wherein the alkenyl cyanide compound is acrylonitrile.

18. A thermoplastic resin composition according to claim 1, wherein the thermoplastic resin (b) comprises 1 to 50% by weight of polymer (A), 5 to 70% by weight of polymer (B) and 10 to 90% by weight of polymer (C).

19. A thermoplastic resin composition according to claim 1, wherein the thermoplastic resin (b) comprises 5 to 30% by weight of polymer (A), 7 to 50% by weight of polymer (B) and 30 to 80% by weight of polymer (C).

20. A thermoplastic resin composition according to claim 1, wherein the weight ratio of the poly(phenylene ether)(a)/the thermoplastic resin (b)/the other different styrenic resins (c) is 5-95/1-60/2-94.

21. A thermoplastic resin composition according to claim 1, wherein the weight ratio of the poly(phenylene ether)(a)/the thermoplastic resin (b)/the other different styrenic resins (c) is 10-60/5-50/5-85.

22. A thermoplastic resin composition according to claim 1, wherein the weight ratio of the poly(phenylene ether)(a)/the thermoplastic resin (b)/the other different styrenic resins (c) is 10–60/5–30/5–85.

23. A thermoplastic resin composition according to claim 7, wherein the other different styrenic resins (c) comprises rubber-modified polystyrene (x) and a homopolymer of styrene (y), and wherein the weight ratio of the poly(phenylene ether) (a)/the thermoplastic resin (b)/the rubber-modified polystyrene (x)/the homopolymer or styrene (y) is 5–95/1–60/2–50/0–92.

24. A thermoplastic resin composition according to claim 7, wherein the other different styrenic resins (c) comprises rubber-modified polystyrene (x) and homopolymer of styrene (y), and wherein the weight ratio of the poly(phenylene ether) (a)/the thermoplastic resin (b)/the rubber-modified polystyrene (x)/the homopolymer of styrene (y) is 10–60/5–50/5–40/5–90.

25. A thermoplastic resin composition according to claim 7, wherein the other different styrenic resins (c) comprises rubber-modified polystyrene (x) and a homopolymer of styrene (y), and wherein the weight ratio of the poly(phenylene ether) (a)/the thermoplastic resin (b)/the rubber-modified polystyrene (x)/the homopolymer of styrene (y) is 10–60/5–30/5–30/7–60.

26. A thermoplastic resin composition comprising
    (a) 5 to 99% by weight of a poly(phenylene ether),
    (b) 95 to 1% by weight of a thermoplastic resin which is obtained by polymerizing, in the absence of a rubber-like polymer, a resin constituent mixture consisting of an aromatic alkenyl compound, an alkenyl cyanide compound, and other alkenyl monomers polymerizable with said monomers, and
    (c) 2 to 94% by weight of other different styrenic resins other than thermoplastic resin (b) selected from the group consisting of homopolymer and copolymers of styrene and rubber-modified polymers obtained by hompolymerizing or copolymerizing styrene in the presence of a rubber-like polymer, said thermoplastic resin (b) comprising (A) 1–50% by weight of a polymer having an alkenyl cyanide compound content of 1% or more but less than 10% by weight, (B) 1–70% by weight of a polymer having an alkenyl cyanide compound content of 10% or more but less than 20% by weight, (C) 5–90% by weight of a polymer having an alkenyl cyanide compound content of 20% or more but less than 40% by weight.

27. A thermoplastic resin composition according to claim 26, wherein the other alkenyl monomer copolymerizable with the aromatic alkenyl compound and the alkenyl cyanide compound is at least one compound selected from the group consisting of alkyl acrylates, alkyl methacrylates, unsaturated acid anhydrides, and unsaturated acids.

* * * * *